US008370847B2

(12) United States Patent
Bedi et al.

(10) Patent No.: US 8,370,847 B2
(45) Date of Patent: Feb. 5, 2013

(54) MANAGING PERSISTENCE IN A MESSAGING SYSTEM

(75) Inventors: Bharat V Bedi, Portsmouth (GB); Andy J Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 11/770,961

(22) Filed: Jun. 29, 2007

(65) Prior Publication Data

US 2008/0127208 A1     May 29, 2008

(30) Foreign Application Priority Data

Jul. 1, 2006   (GB) .................................. 0613193.2

(51) Int. Cl.
    *G06F 3/00*      (2006.01)
(52) U.S. Cl. ....................................................... 719/313
(58) Field of Classification Search .................. None
    See application file for complete search history.

(56) References Cited

U.S. PATENT DOCUMENTS 5,557,738 A * 9/1996 Townsley et al. ............... 714/14
7,127,507 B1 * 10/2006 Clark et al. .................... 709/224
2002/0078132 A1 * 6/2002 Cullen et al. .................. 709/201
2002/0152299 A1 * 10/2002 Traversat et al. ............. 709/223
2002/0156983 A1 * 10/2002 Jones et al. .................... 711/143
2004/0003064 A1 * 1/2004 Astley et al. .................. 709/223
2005/0021757 A1 * 1/2005 Helliwell ...................... 709/226
2005/0262215 A1 * 11/2005 Kirov et al. ................... 709/207
2006/0041823 A1 * 2/2006 Wolfgang et al. ............. 714/763
2006/0294238 A1 * 12/2006 Naik et al. ..................... 709/226

* cited by examiner

*Primary Examiner* — H. S. Sough
*Assistant Examiner* — Carina Yun
(74) *Attorney, Agent, or Firm* — Yudell Isidore Ng Russell PLLC

(57) ABSTRACT

Provided are method, apparatus and computer program product for managing persistence within a messaging system. The method includes evaluating the messaging system's exposure to risk of losing messages. Data relating to nominally-persistent messages held in the system is saved to persistent storage if an evaluating step determines that the exposure exceeds at least one risk threshold. This approach enables a reduction in the number of writes to persistent storage compared with conventional systems in which any message that is labeled persistent will be written to disk, since disk writes can be avoided whenever an evaluation determines that the messaging system's exposure to the risk of losing messages is low.

19 Claims, 4 Drawing Sheets

MANAGING PERSISTENCE IN A MESSAGING SYSTEM

FIELD OF INVENTION

The present invention relates to management of persistence in a messaging system.

BACKGROUND

Some known messaging systems provide persistent messaging, in which message state information and messages are saved to logs and message queue data files in persistent storage (such as disk storage). Persistently stored messages are able to survive most failures and restarts of the messaging system. In response to a failure other than a disk failure, the state information and messages can be recovered from the logged data and persistently-stored queues. The recoverability of persistent messages and state information is a significant factor in achieving assured once-only message delivery.

For example, a message queue manager may save a persistent message to disk storage before confirming to an application program that an operation has been successfully performed on the message. In a typical messaging network, a message-sending application program issues a 'put_message' instruction via an API call, to place an outgoing message in a queue. A local queue manager program manages this queue and communicates with other local application programs, or other queue managers within a distributed messaging network, to transfer the message to a target recipient. In a persistent messaging system, the local queue manager saves the message to persistent storage before confirming to the sender application that the 'put_message' operation completed successfully. A persistent message may be written to disk for every 'put_message' and 'get_message' that is performed to transfer the message to its destination (in some implementations, where the message is outside the current syncpoint-manager controlled 'unit of work'), or the message may only be logged when a current unit of work is committed. With distributed units of work, it may be possible to avoid writing logs at a number of intermediate points during a message transfer, but a message that is identified as 'persistent' will be written to persistent storage at a pre-defined point.

In contrast, non-persistent messages are discarded when a queue manager experiences a failure and has to restart, as well as when the queue manager is stopped by an operator command. Although persistent messaging provides great advantages in terms of recoverability and assured message delivery, persistent messaging also has a performance cost. Writing to disk for every 'put_message' and 'get_message' operation will reduce message throughput and increase application response times, so there is a business justification for handling some messages non-persistently.

Because of the tradeoff between assured message delivery and performance, the WebSphere MQ family of products from IBM Corporation include support for setting persistence or non-persistence as optional attributes of a message and considerable work has been done to improve performance of persistent messaging (WebSphere and IBM are trademarks of International Business Machines Corporation). Performance has been enhanced by use of high performance disk storage, commit processing techniques that optimize performance in the absence of failures, and efficient recovery techniques to deal with failures. For example, U.S. Pat. No. 5,452,430, filed on 23 Mar. 1994 and assigned to IBM Corporation, describes an approach to handling persistent and non-persistent messages that aims to reduce delays during recovery from a system failure, by storing persistent and non-persistent data in separate sets of pages within a single message queue. C. Mohan and D. Dievendorff, "Recent Work on Distributed Commit Protocols, and Recoverable Messaging and Queuing" IEEE Data Engineering Bulletin, 17(1), pages 22-28, 1994, describes developments in the areas of distributed commit protocols and recoverable messaging and queuing.

Typical messaging systems still have a relatively inflexible specification of persistence. One proposal is to give messaging system users an opportunity to specify a different persistence policy for different system states. In such a messaging system, users would benefit from increased granularity of control over persistence, but the persistence behaviour is fixed when the persistence policy is specified.

Many messaging systems still invest too much of their resources on ensuring message integrity, whenever message persistence has been specified as a desired characteristic. As mentioned above, saving information to non-volatile ('persistent') storage for every message flowing through the system impacts performance, due to the slow speed of disk writes. The result of such persistence may be a level of assurance of message delivery that goes beyond the requirements of the communicating application programs, and in such cases the performance cost may not be justified. Many modern computer systems are highly reliable, and the benefits of persistence are only obtained when a failure or shut-down occurs. In the absence of shut-downs and system failures, once-only message delivery can be achieved using transactional commit processing, while saving messages and message state information to volatile main memory.

Furthermore, there is increasing use of embedded and pervasive computing devices within messaging networks. Many of these devices have far less storage capacity than a typical desktop computer. Many small devices use flash memory such as CompactFlash for storage, but CompactFlash has a finite limit for the number of times it can be written to before the memory reaches the end of its life and can no longer be erased for re-writing. A typical finite limit for currently available devices is around 1,000,000 write cycles. These issues associated with writing log records and saving messages to flash memory such as CompactFlash cannot be ignored.

SUMMARY

A first aspect of the present invention provides a method for managing persistence within a messaging system, comprising the steps of:
 evaluating the messaging system's exposure to risk of losing messages; and
 saving data relating to a message-based communication to persistent storage in response to the evaluating step determining that the exposure exceeds at least one risk threshold.

This approach enables a reduction in the number of writes to persistent (non-volatile) storage; some write operations can be avoided when an evaluation determines that the messaging system's exposure to the risk of losing messages is low. Persistent storing in response to reaching 'exposure' thresholds is an alternative to persistence behaviour being fixed by predefined message attributes or a predefined persistence policy, and can be implemented to achieve increased message throughput or lower processing overhead compared with conventional persistent messaging systems. Furthermore, in a messaging environment in which exposure thresholds are only breached on an exceptional basis, the number of writes and the amount of data written to non-volatile storage may be greatly reduced compared with conventional persistent messaging systems, enabling the use of non-volatile storage technologies which have limited capacity and a limitation on the number of write cycles (such as flash memory or EEPROM) compared with hard disks. The data that is saved to persistent storage may comprise message data and/or message state information such as log records saved for the purpose of recovery from failures.

Typical known messaging systems are unable to make use of the fact that the messaging system can often be predicted to deliver messages successfully and only occasionally needs to rely on persistent saving of information to protect against failures. The present invention enables an autonomic triggering of saving to persistent storage when an identified exposure to the risk of message loss exceeds a threshold, reducing that exposure when required but enabling avoidance of persistent saving when the exposure is determined to be low.

The evaluating step may be performed at various times, such as when a new message arrives at the messaging system, or when a user disconnects. The evaluating step preferably evaluates a set of rules representing risk factors for loss of messages that take account of dynamic conditions affecting the messaging system. For example, message data and state information may be stored persistently for a messaging system in response to the evaluating step determining that more than a threshold number N of messages held in memory have not been persisted. In a preferred embodiment, messages designated 'non-persistent' (which are deemed not to require reliable once-only message delivery) are omitted from the evaluation.

In one embodiment, a risk evaluation triggers writing to non-volatile storage such as disk storage or flash memory, and data related to a set of messages is iteratively persisted until the exposure to risk has been reduced to a target level (i.e. persisting only a subset of the data that could benefit from saving persistently). In one embodiment, an administrator option determines whether an automatically-triggered save to persistent storage should only persist a subset of message-related information that is sufficient to reduce risk to an acceptable level; or whether the save operation should persist all messages and state information that has not yet been persisted, other than messages that are designated as non-persistent.

A second aspect of the invention provides a data processing apparatus comprising:
  a processor;
  a volatile data store;
  a non-volatile data store;
  a messaging manager; and
  a persistence manager;
    wherein the persistence manager is arranged to evaluate the messaging manager's exposure to risk of losing messages, and to initiate an operation of saving data relating to a message-based communication from the volatile data store to the non-volatile data store in response to the evaluation determining that the messaging manager's exposure to risk of losing messages exceeds at least one risk threshold.

A third aspect of the invention provides a computer program comprising a set of instructions, implemented in program code, for controlling a data processing apparatus on which the program code executes to implement a method as described above. The computer program may be made available as a program product comprising program code recorded on a recording medium, or may be made available for transfer to a data processing apparatus via a data transfer medium.

BRIEF DESCRIPTION OF DRAWINGS

Embodiments of the invention are described below in more detail, by way of example only, with reference to the accompanying drawings in which.

DESCRIPTION OF EMBODIMENTS

The present invention is applicable to managing message persistence, and is implementable within a data processing system or network where it is desirable to enhance messaging performance and/or to reduce the overhead of persistent handling of messages while keeping message delivery reliability within acceptable levels.

The problem of balancing message assurance and message performance applies both to a point-to-point messaging model and a publish/subscribe messaging model. In point-to-point messaging, a message is sent to a single destination—for example by a sender application program issuing a command via a messaging API to send the message to a named queue of a named message queue manager. A network of message queue managers handles the routing and transformation of messages from the sender system to the target queue. The named target queue is an input queue for the destination application program, and the destination application program asynchronously retrieves the message from this input queue (i.e. when the destination application program is ready to process the message).

In publish/subscribe messaging, subscribers specify the messages they wish to receive (for example by registering a subscription that specifies a topic string) and publishers send messages without specifying which subscribers should receive them. A comparison is made between topic names within a newly published message and the topic strings of a set of registered subscriptions, this comparison being performed at either an intermediate publish/subscribe message broker or a publish/subscribe matching engine implemented at each subscriber system. Other publish/subscribe solutions use message contents instead of topic names to determine which subscribers should receive which messages, or use a combination of topic names and filters that specify required message contents.

Figure 1:
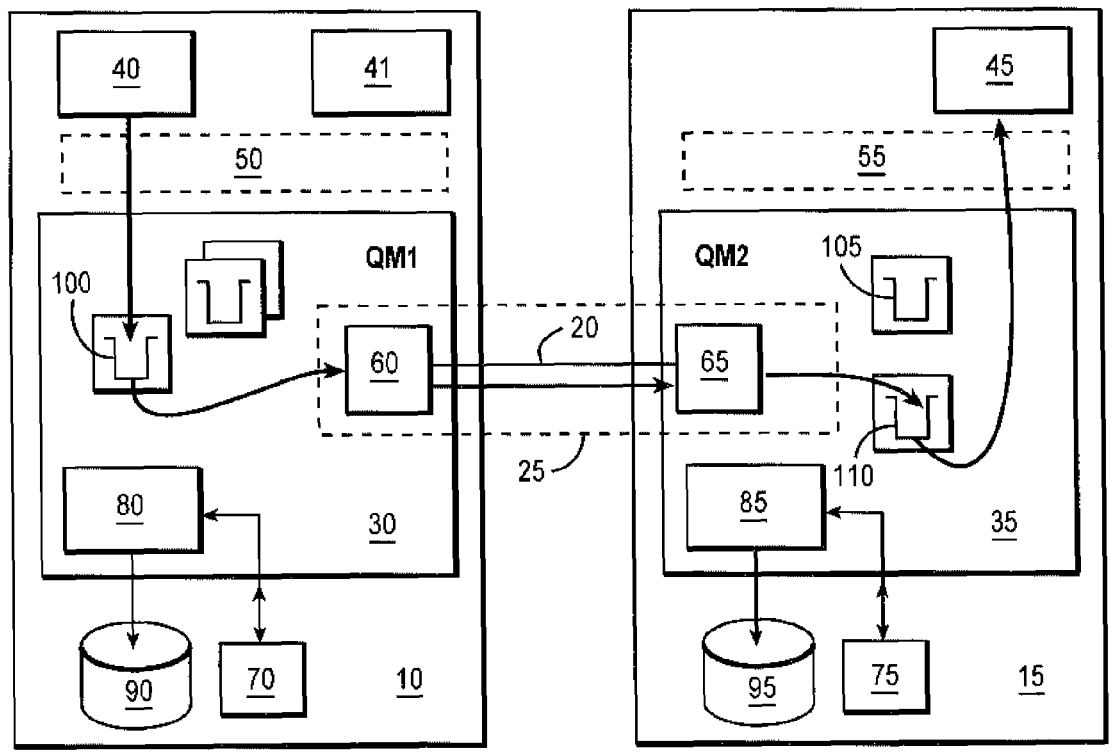
FIG. 1 is a schematic representation of a simplistic messaging network, as is known in the art.

A typical distributed messaging network comprises a plurality of heterogeneous data processing systems that each include a messaging component. FIG. 1 shows a simplistic example of a point-to-point messaging network including only two data processing systems 10, 15 connected via a communication link 20. A real messaging network may include, for example, hundreds of separate data processing systems communicating via wired or wireless connections. Each data processing system 10,15 in the messaging network includes a messaging manager 30,35, which may be implemented in computer program code or in hardware using electronic circuits. The messaging functions on a particular data processing system 10 may be integral with an application program 40, 41 that performs business processing, but in the present embodiment the application programs 40,41,45 and messaging managers 30,35 are separate but interoperating components of their respective data processing systems. The application programs 40,41,45 can communicate with each other via the messaging network, and each communicate with a local messaging manager 30,35 via a messaging interface (API) 50,55. Each messaging manager 30,35 relies on processing functions of a hardware processor (not shown) and on services provided by the operating system (not shown) on the data processing system on which it runs, and the messaging managers deal with any data transformations required to address operating system differences within the network.

The messaging system architecture of FIG. 1 facilitates relatively simple application program development, and addresses many of the problems associated with integration and interoperation between a diverse set of components within a heterogeneous distributed data processing environment. Common messaging functions can be implemented within a messaging manager 30,35 and the application programs 40,41,45 can be written to invoke functions of the respective local messaging manager via the messaging API 50,55. Messaging managers 30,35 such as the WebSphere MQ messaging manager programs from IBM Corporation provide asynchronous message communication via intermediate message repositories (message queues) that are managed by the messaging managers. In FIG. 1, message queues 100,105,110 are represented schematically as features of respective messaging managers but the physical representation of a queue is a data structure within system memory 70,75 (e.g. RAM) or within a non-volatile data store 90,95. The above-described components of a data processing system are interconnected via a communications bus within the data processing system, as is well known in the art.

A first application program 40 running on a first data processing system 10 can communicate with a remote application program 45 by issuing a 'put_message' command that is interpreted by the messaging API 50. The message is initially placed on a transmission queue 100 that is managed by the local messaging manager 30. The local message queue manager examines information within a header of each message placed in the transmission queue 100 to determine a next messaging manager within the network to which the message should be routed. A pair of cooperating message channel agents 60,65 (or 'movers') then handle transfer of relevant messages via a communication channel 25 that is established between them, moving messages from the transmission queue 100 to a queue 110 managed by the second messaging manager 35.

If the second messaging manager is merely an intermediate node of the network between the first messaging manager 30 and a destination messaging manager, the second messaging manager 35 places the message in a further transmission queue 105 that serves as a temporary repository for the message until the message can be forwarded to the next network node. Alternatively, if the second messaging manager 35 is the local messaging manager for the destination application program 45, the message will be placed in an application input queue 110 for retrieval by application program 45. The input queue 110 is serviced by the application program 45 when the application is ready to process the message.

This asynchronous message transfer via intermediate message repositories ('queues') can be performed quickly when connections are available, but is particularly beneficial in avoiding the need for dedicated end-to-end connections between remote application programs—allowing messages to be sent when the target application is not currently able to process the new messages. Although not shown in FIG. 1, there may be multiple asynchronous hops across a network from a first sending system 10 to a remote destination system 15.

In some known messaging systems, messages may be handled 'persistently' or 'non-persistently' as specified by a system administrator or sender application program. A persistence manager 80,85 writes messages to a respective persistent store 90,95 (for example, an allocated area of non-volatile disk storage) in accordance with the specified persistence required by the communicating application programs. Persistent messaging may be specified for all messages sent between certain applications or messaging managers, or persistence may be a requirement for only particular messages sent between those applications. A persistent message may be saved to the local persistent store 90 when the message is placed on the first transmission queue 100 by the sender application program's local messaging manager 30 (i.e. a copy of the queue may be saved to disk storage), and a log record may be written to the local persistent store 90 both when the message is put to the transmission queue and when the message is successfully moved from the transmission queue 100 to the application input queue 110. The message and associated log records may be written to a second persistent store 95 on the second system 15 when the message is placed in the application input queue 110, and log records may also be written when the message is retrieved from this queue 110 by the target application program 45.

Some known systems provide support for distributed transactions that reduce the number of times message are hardened to disk (i.e. writing to persistent storage at commit of a distributed unit of work instead of on every 'put_message', 'get_message' or other update operation). Some known systems, in which many operations are running in parallel, combine log records for several operations in a single buffer and force them to disk at the same time. These features provide performance improvements, but persistence and log handling remain a significant performance bottleneck.

Thus, some known systems provide options for whether and when a message and log records are written to persistent storage, but the options are predefined when the persistence requirements are specified. Therefore, known solutions do not take account of many of the circumstances that can affect messaging reliability within the messaging network.

Embodiments of the present invention implement an autonomic determination of whether and when to perform a save to persistent storage based on an assessment of the current messaging system's exposure to the risk of loss of messages or message state information.

Figure 2:
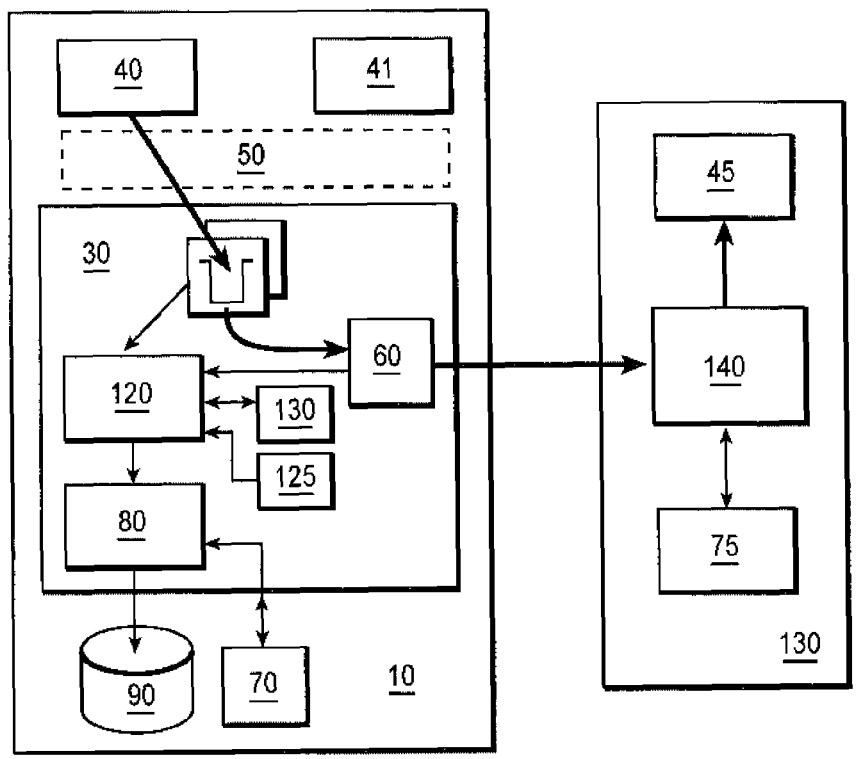
FIG. 2 is a schematic representation of an example messaging system according to a first embodiment of the invention.
Figure 3:
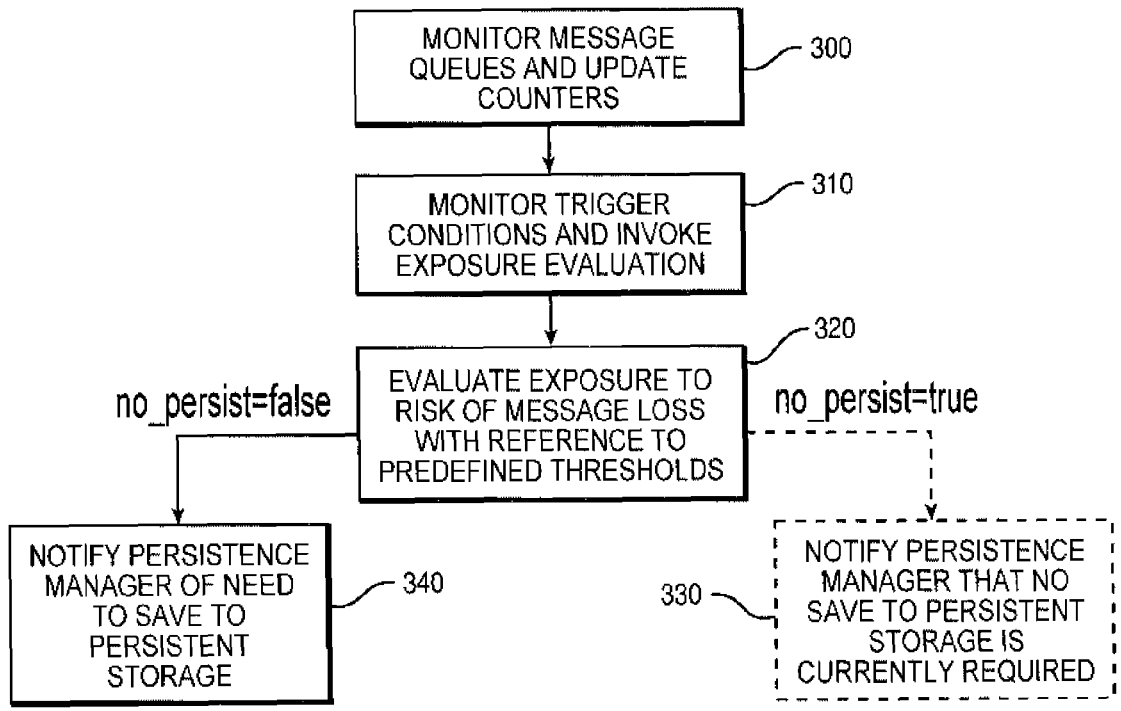
FIG. 3 is a schematic flow diagram representation of a sequence of steps of a method for managing persistence according to an embodiment of the invention.

Referring to FIGS. 2 and 3, an exposure determination component 120 of the messaging system monitors 300 the depth of the message queues (i.e. number of messages held on the queues) that are being managed by the messaging system 30. The exposure determination component 120 updates 300 an in-memory counter 130 of messages that require delivery, incrementing the counter when a message arrives and decrementing when a message has been delivered. When certain trigger conditions are encountered 310 (as described in more detail below), the exposure determination component 120 executes 320 an evaluation function to determine whether a risk exposure threshold has been reached. If the evaluation shows that the system's exposure to loss of message related data is within safe boundaries, the persistence manager 80 may be notified 330 that no save to persistent storage is currently required; but in other embodiments of the invention the persistence manager is only actively notified if a save to persistent storage is determined to be necessary (hence the dashed lines in FIG. 3).

If it is determined that a threshold has been reached or exceeded, this implies a current need to save data to persistent storage and so the exposure evaluation component 120 triggers the persistence manager 80 to persistently save message related data to a non-volatile data store. The persistent save operation reduces the exposure to the risk of data loss in the event of a subsequent system failure, since the messages and message state information can be retrieved from non-volatile (persistent) storage unless there is a failure of the non-volatile data store itself.

The messaging system holds a set of rules within a rules repository 125 which are evaluated by the exposure determination component 120 when appropriate (e.g. when a message arrives, or a user disconnects), to determine the messaging system's current exposure to risk of losing 'nominally-persistent' messages (i.e. messages which are candidates for saving to persistent storage). Messages designated non-persistent are disregarded from the exposure determination according to this embodiment of the invention.

The exposure determination component 120 of the present embodiment is not found in conventional messaging systems. This exposure determination component implements an exposure policy that has been agreed for the messaging system (as a Service Level Agreement, for example) and which is defined in the set of rules within the rules repository 125. The exposure determination component 120 analyses messaging statistics—applying an evaluation function to evaluate the level of exposure to risk of data loss, with reference to the nominally-persistent messages that are currently being managed by the messaging system. The exposure determination refers to a set of criteria including, in a first embodiment:

the number of messages held on queues managed by the local messaging manager and awaiting delivery to recipients, which messages have not yet been saved to persistent storage; and the sender-specified persistence classifications for the queued message.

A second embodiment also takes account of:

data relating to failures of the messaging system, such as an estimate of the time until a next failure with reference to statistics for recent system failures (for example, monitoring system 'uptime' and computing averages that can be compared with the system's current operation), and detection of conditions likely to result in a failure; and data relating to an actual message loss and recognition of the need for increased persistence to avoid further losses to comply with obligations of a service level agreement;

In a publish/subscribe messaging system, such as described below with reference to FIG. 4, the criteria evaluated to assess the system's exposure to the risk of losing messages can include the number of retained messages (see below) that have not yet been saved to persistent storage, and the number of durable subscriptions.

For example, the exposure could be high if either a threshold number or threshold percentage of messages that require reliable delivery are in memory but not persisted. Another example of high exposure could be "5 or more retained publications not persisted". It will be recognized that these example criteria and associated thresholds are merely illustrative examples, and many other risk criteria and specific rules and thresholds are within the scope of the invention.

In an embodiment in which there is an option for persisting a subset of the vulnerable data, the risk assessment function can be performed repeatedly during the performance of iterative disk writes until sufficient data has been persisted to reduce the risk to an acceptable level. The policy of whether to persist all available data, or only to persist the minimum amount of data required to bring the system below an acceptable level of exposure, may be provided as an administrator option.

In the present embodiment, a snapshot facility is provided by the persistence manager 80 for persisting the current state of the messaging system and all available nominally-persistent (but not yet persisted) messages. This snapshot facility is invoked by the exposure determining component 120 when one of its thresholds is reached. These thresholds defined within the rules in rules repository 125 can themselves be tuned by the system using an autonomic learning algorithm, to take account of events such as the history of power failures. Such autonomic tuning helps to determine the level of exposure to risk which is considered to be acceptable for a particular system.

A first example implementation of the determining component 120 maintains in-memory counters a,c 130 of both the number of messages held by the messaging system, which are designated persistent but which are not yet saved persistently, and the number of seconds since the last system failure:

a=number of nominally-persistent messages at risk; and
c=seconds since last system failure;

for comparison with:

b=threshold number of nominally-persistent messages at risk; and
d=threshold number of seconds since last failure.

Items b and d can be set administratively, or can be tuned automatically by observing the behaviour of the messaging system over time.

For example, d, the threshold number of seconds for determining whether the risk of system failure is acceptable, can be autonomically evaluated by periodically storing the value of c (uptime) to non-volatile storage. Then, during restart processing after a power failure, the last stored value of c can be checked to see how long the messaging system survived without a power failure. This could be added to a history list of recent power failures, and the value of d could be calculated as the minimum (minus a safety margin of a few seconds or minutes) of the last 3 uptime entries. For example, if recent uptime values c are:

| | |
|---|---|
| 01-JUN-06 10:00 | 3600 |
| 01-JUN-06 11:00 | 7200 |
| 01-JUN-06 13:00 | 3000 |
| 01-JUN-06 13:50 | 7200 |

Then d can be calculated as the minimum of the last 3 entries, minus a safety margin of (say) 15 seconds. This would give a value of d of 2985 seconds.

A current exposure to risk is then calculated as a function of the risk factors relative to their threshold levels, so $$\text{overall\_risk} = (a/b + c/d)/2$$

where 2 is the number of terms being evaluated. This computed 'overall_risk' value is a number between 0 and 1 (for example 0.80, if a and c are each approximately 80% of their respective threshold values b and d).

This computed overall_risk value is then compared with an aggregate risk threshold (for example, checking that the overall_risk value is less than 0.90), and a check is performed that none of the thresholds for individual metrics have been exceeded:

no_persist=$a<b$ AND $c<d$ AND overall_risk<0.90

(where AND is the Boolean AND operation).

If this no_persist evaluates to true, then no data is saved to persistent storage. If no_persist evaluates to false, some or all of the nominally-persistent message data needs to be persisted.

In a first implementation, the evaluation result no_persist=false is responded to by flushing all at risk data (i.e. data that is nominally-persistent and not yet persisted) to non-volatile storage. Counters a and c are then reset.

In a second implementation, the reduction of a system's exposure to risk is performed iteratively and repeatedly. The evaluation result no_persist=false is responded to by flushing some at-risk data to non-volatile storage. Counters a and c are updated (reduced by the number of messages now safely stored), and then the risk assessment is repeated by recalculating the overall_risk value and evaluating the no_persist function:

overall_risk=$a/b+c/d$ no_persist=$a<b$ AND $c<d$ AND overall_risk<0.90

These steps of a partial flush, decrementing counters, recalculating an aggregate risk value and evaluating the no_persist function are repeated until no_persist evaluates to true. Although this iterative flushing involves multiple calculations, it enables a relatively small amount of data to be written to non-volatile storage while maintaining both the messaging system's overall exposure to the risk of message loss and each individual risk metric within acceptable levels.

One embodiment implements the partial flush to non-volatile storage by processing message related data as though a complete flush of the available nominally-persistent data is to be performed, but monitoring the effect on the set of in-memory counters 130 while preparing to flush. When it is determined that a flush of currently-identified data items will bring all of the counters beneath their threshold levels, the currently identified data items are flushed to non-volatile storage. This approach involves performing the iterative processing to determine how much data is required to be flushed in advance of any writes to non-volatile storage, enabling the flush to be performed in one go for improved efficiency.

In a messaging environment in which exposure thresholds are breached only on an exceptional basis, the number of writes to non-volatile storage and the amount of data written to non-volatile storage may be much lower than in conventional messaging systems, such that limited-write-cycle non-volatile storage technologies (for example flash memory or EEPROM) can provide adequate non-volatile storage. This enables extension of persistent messaging capability to a wider range of data processing devices, such as portable electronic devices using CompactFlash.

In various embodiments of the invention, the evaluation of risk can be done every time a nominally-persistent message arrives, or after receipt of a pre-set number of nominally-persistent messages, and this message-triggered evaluation is typically accompanied by a periodic evaluation of the functions (regardless of the arrival of messages) to make sure the up-time criteria has not been breached.

In other embodiments of the invention, trigger conditions prompting an assessment of the exposure to risk of message loss include disconnection of a publisher or subscriber (see below for a description of a publish/subscribe messaging system implementing the invention) and/or alerts from a UPS (uninterruptible power supply) to warn that the power has failed and battery backup has taken over. Where counters of "at risk" messages are maintained on a per-client basis, evaluations of the desirability of saving data to persistent storage can also be performed on a per-client basis.

Another embodiment of the invention implements persistence management within a messaging system that includes a message broker implementing a publish/subscribe message distribution mechanism. In publish/subscribe messaging, published messages are compared with subscription requirements of registered subscribers to identify messaging clients that wish to receive a particular message.

Figure 4:
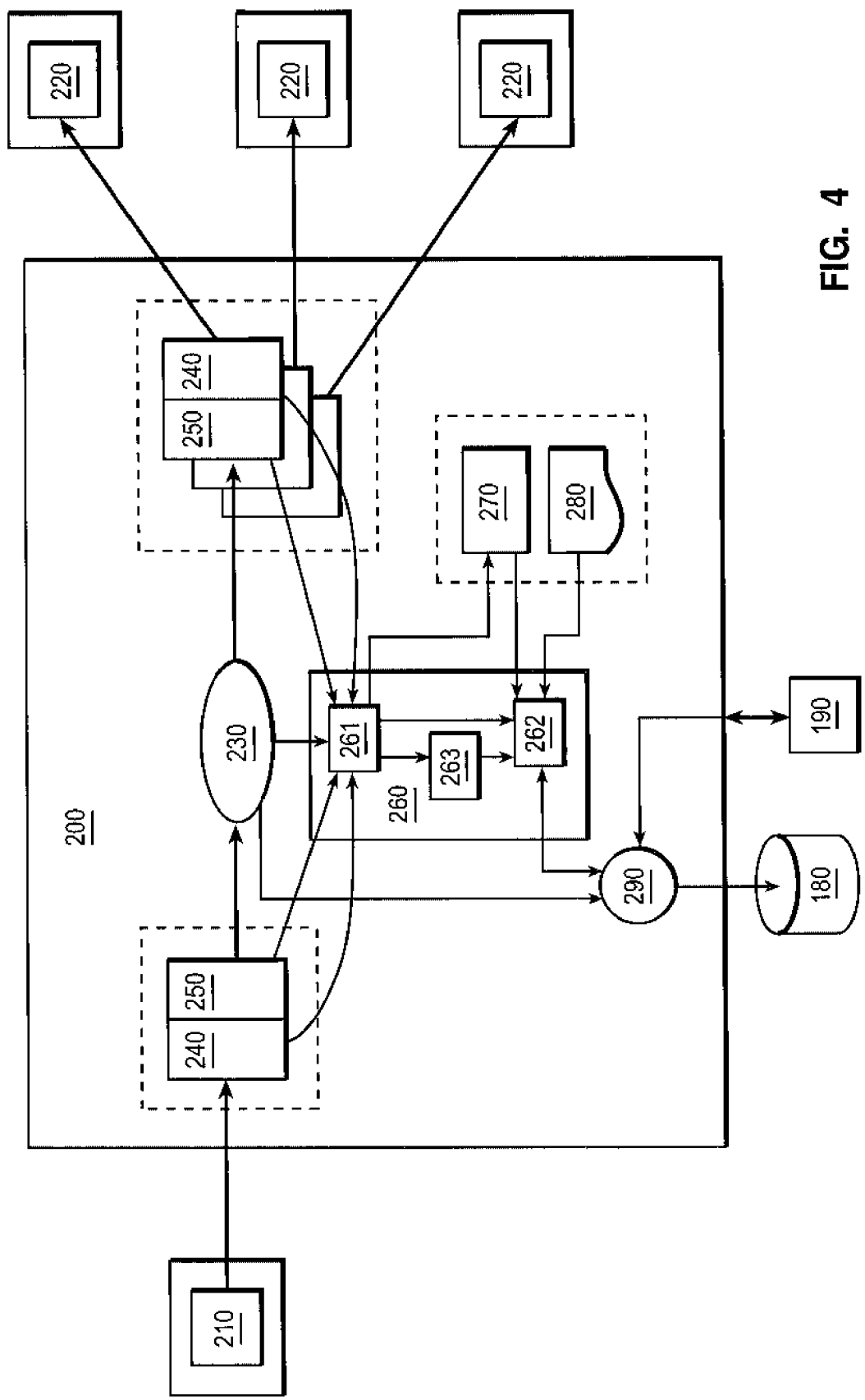
FIG. 4 represents an example messaging system including a publish/subscribe broker, according to another embodiment of the invention.

The exemplary publish/subscribe system of FIG. 4 provides a message broker 200 as an intermediate network node between publishing clients 210 and subscriber clients 220. The message broker includes a matching engine 230 that compares topic name strings within headers of received messages with topic strings specified by subscribers, and the messages are then routed to the matching subscriber clients 220. The message broker 200 is a second example of a message manager, which is implementable in computer program code such as the Java™ programming language, and which provides messaging support on behalf of sender and receiver messaging clients. Within the message broker 200, each client has a communications stack 240 and a protocol handling module 250 for marshalling and demarshalling of the software's internal representations of the messages and protocol to and from their canonical byte formats to allow messages to flow over the network connections. The communications stack has access to a TCP/IP socket for communications with the external network.

Figure 5A:
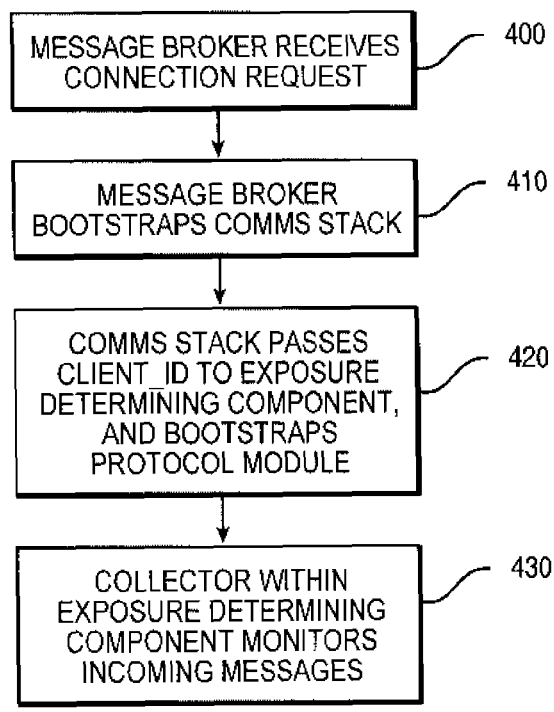
FIGS. 5A and 5B are schematic flow diagrams representing a sequence of steps of a method for managing persistence that is implementable in a publish/subscribe broker such as shown in FIG. 4.
Figure 5B:
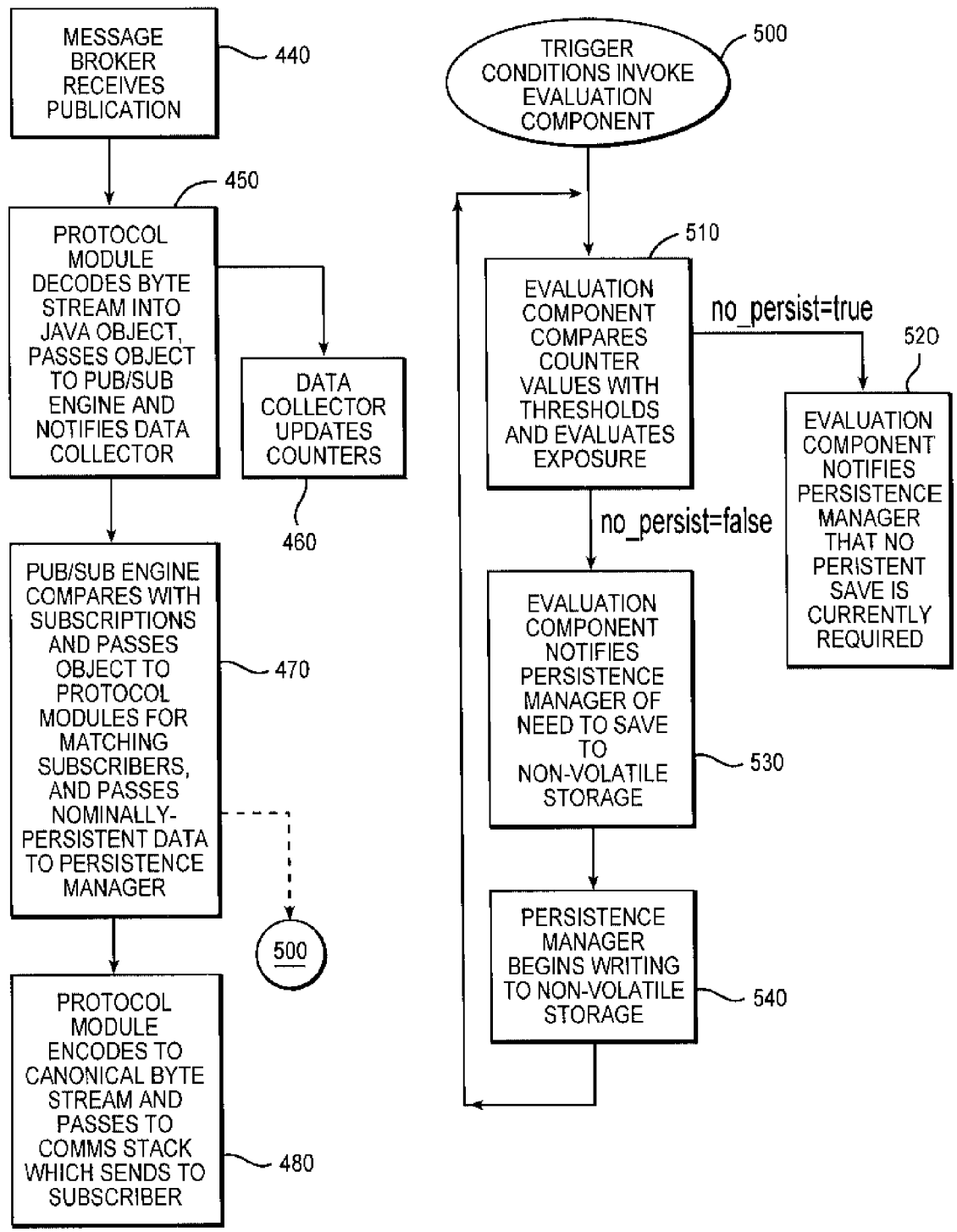

FIGS. 5A and 5B show operational steps within a message broker implementing persistence management according to an embodiment of the present invention. The message broker 200 listens on a particular TCP port for newly established client connections. On receipt 400 of an inbound connection request, the message broker 200 bootstraps 410 a communications stack 240 for that client. This stack is responsible for maintaining the connection with the client and monitoring the current state of the socket connection. The communications stack also passes 420 a client identifier for the new connection to an exposure determining component 260. The client identifier is used to create a separate table 270 for each client. The table will be used to hold counter values for that client (see below). A data collector function of the exposure determining component 260 then begins monitoring 430 messages received from that client, updating the counter values when nominally-persistent messages are received, and decrementing the counter values when such messages are successfully forwarded to subscribers. Subsequent processing steps are described below with reference to FIG. 5B.

The communications stack also bootstraps a protocol handling module 250. The protocol module is responsible for decoding 450 and encoding the message formats and communication protocol to and from canonical byte format (as serialised over the physical network link) into an internal object representation that can be consumed by the message broker. For example, the protocol module 250 will demarshal inbound message publications from a client into object form and submit them 450 to the publish/subscribe matching engine 230 for delivery to subscribers. The protocol module 250 is responsible for fulfilling connection, subscription and other requests from the client.

When each message is received 440 by the message broker from a particular messaging client, the protocol module decodes 450 the byte stream into a Java object, passes the object to the publish/subscribe matching engine 230, and notifies the exposure determining component 260. A data collector function 261 of the exposure determining component 260 updates 460 a first counter within the table 270 that is held for that client—incrementing the counter for each new message and decrementing the counter for each message successfully transferred to the relevant set of registered subscribers. The use of a separate counter and table for each client is not essential to all implementations of the invention (since the total number of messages held by a system may be an adequate metric for risk assessments), but separate tables and counters enable differentiation between clients and the different clients may have different persistence requirements. Some publisher clients may have many more subscribers registered to receive their messages than other publisher clients.

The publish/subscribe matching engine compares 470 the received publication with subscriptions of registered subscribers to identify matching subscribers, and passes the Java object to respective protocol modules for the matched subscribers. The matching engine also passes data relating to nominally-persistent messages to a persistence manager 290.

The data collector function of the message broker's exposure determining component 260 also maintains a counter representing the number of seconds since the last system failure for this message broker, and may include a counter for the number of seconds since a connection failure for a particular publisher or subscriber client.

Some publish/subscribe messaging systems provide support for retained publications, where the last message published on each of a particular set of topics is retained to enable retrieval by new subscribers. That is, new subscribers are not required to wait for newly published messages but can retrieve the most-recently published message on a given topic. In one embodiment of the invention, the exposure determining component 260 maintains a counter for the current number of retained publications, since loss of a retained publication may be as undesirable for some applications as loss of a new publication.

Extending the example given above to take account of retained publications, let us assume:
  a=number of nominally-persistent messages at risk;
  b=threshold number of nominally-persistent messages at risk;
  c=seconds since last system failure;
  d=threshold number of seconds since last failure;
  e=number of retained nominally-persistent messages at risk; and
  f=threshold number of retained nominally-persistent messages at risk.

The risk exposure assessment can then be performed as follows:

$$\text{overall\_risk} = (a/b + c/d + e/f)/3$$

$$\text{no\_persist} = a<b \text{ AND } c<d \text{ AND } e<f \text{ AND overall\_risk} < 0.90$$

With message-related data saved to persistent storage unless no persist evaluates to true.

Described below is an example scenario in which a connected client 210 wishes to publish a message via the message broker 200. The client 210 sends the publication to the broker as a byte stream, where it is received 440 by the communications stack. The received byte stream is passed to the protocol module 250 which decodes 450 the publication from canonical byte stream format into a publication object. The protocol module 250 invokes a "publish" method on the publish/subscribe engine 230, which matches 470 topic names within incoming publications with topic names within registered subscriptions made by other subscribing clients 220. Matches may be exact or may rely on wildcards within the subscriptions. A set of matching subscribers is thus derived from the total set of subscribers that are currently registered with the publish/subscribe matching engine 230. Depending on the particular implementation and the metrics to be monitored, the protocol handling module 250 and the publish/subscribe matching engine 230 may each send information to the exposure determining component 260, which updates 460 its tables 270 accordingly. In the present embodiment, the protocol handling modules provide information about new messages received and messages forwarded to subscribers.

The publish/subscribe matching engine 230 then passes 470 the message object to an appropriate protocol handler module 250 for each of the identified subscribers, where the protocol handler module encodes 480 the message object for transmission across the network to respective identified subscribers, and an associated communications stack sends the encoded byte-stream message to subscribers. The protocol handlers or the publish/subscribe matching engine may be responsible for identifying nominally-persistent messages (i.e. messages designated "persistent" by the sender application) and passing data relating to such messages to a persistence manager 290, but in the present embodiment this function is performed by the protocol handlers. The receipt of message data by the persistence manager is one of a number of possible trigger conditions 500 for performing a persistence determination as described below.

In one example implementation of the invention, the number of subscribers which match the publication is also passed to the exposure determination component 260, which updates its statistical data for the respective publisher client. The number of matching subscriptions per publication can be used as an indication of how valued a particular publisher's messages are, and can be used as a factor in the determination of whether to save message-related information to persistent storage. For example, if the average number of subscribers for a particular client's messages is less than 10, a determination may be made not to save those messages persistently.

The number of matching subscribers is inserted into the table 270 by the exposure determining component 260, for example computing an average between the current value in the table and the number of subscribers for the latest publication. In this embodiment, the exposure determining component 260 includes a set of cooperating functional components:

1) a collector component 261 for updating the counters and other values in the table 270, and potentially collecting and maintaining other statistical data from components within the message broker system; and
  2) an evaluating component 262 for determining whether to persist or not, based on rules held in the rules repository 280; and
  3) a triggering component 263 for initiating performance of the evaluating component in response to predefined trigger conditions.

Within the message broker 200, each client has a unique identifier which serves as a key for accessing data within the respective table 270.

If a message published by sending to the publish/subscribe message broker is marked as "persistent" by the sending client, the publish/subscribe matching engine passes the message to a persistence manager 290. At this stage the nominally-persistent message is merely a candidate for persistent storing by the persistence manager, and the message is held in volatile memory 190, since the final decision about whether to save the message persistently has not yet been made. If the published message is marked as "non-persistent", the message is only held in memory 190 and is not passed to the persistence manager at all 290.

The persistence manager is responsible for persistent storing of message data to non-volatile disk storage 180 under transactional control. At this point, either when the persistence manager receives new data or in response to some other trigger condition, the persistence manager is invoked and the exposure determining component 260 is invoked 500 to determine whether persistence is required or not. The persistence manager 290 preferably invokes the exposure determining component 260, passing in the client ID of the relevant client.

The exposure determining component 260 applies a set of stored rules from rules repository 280, to determine 510 whether to persist or not. A separate determination may be made for each client in embodiments in which risk assessment metrics are held on a per-client basis. The value returned 520,530 to the persistence manager 290 by the exposure determining component 260 is a simple Boolean true or false value indicating whether to persist or not, or a set of true or false values associated with a set of client IDs. Having obtained a positive persistence decision 530 from the exposure determining component 260, the persistence manager 290 starts writing 540 nominally-persistent messages and message-related data to persistent storage. As noted above and indicated in FIG. 5B, the evaluation of the messaging system's exposure to the loss of message-related data may be performed iteratively during preparation for a flush to disk, and if a determination is made that only a partial flush to disk is required to bring all the counters representing exposure factors below their threshold values, only an initially-identified subset of "at risk" data is flushed to disk at this time.

The exposure determination enables the messaging system to make informed decisions regarding when it can avoid persistent saving of messages and message state information. A decision not to persist may be made for messages received from a publishing client for which there are few interested subscribers, and a number of criteria may be evaluated to determine the messaging system's current exposure to the loss of message-related data.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method in a data processing system for managing persistence within a messaging system, the method comprising:

evaluating a level of exposure of the messaging system to a risk of losing a plurality of nominally-persistent messages stored within a volatile storage of the messaging system in the event of a failure of the messaging system, wherein the plurality of nominally-persistent messages are candidates for saving to a non-volatile storage, wherein the evaluating further comprises:

monitoring a set of metrics related to a processing of messages by the messaging system, wherein the monitoring further comprises monitoring the number M within one or more queues at the messaging system; and comparing monitored values for the set of metrics with a set of threshold values to determine whether the monitored values are within acceptable risk thresholds, wherein the comparing further comprises comparing the number M with the threshold number N;

in response to the evaluating, determining whether the risk of losing a plurality of nominally-persistent messages exceeds at least one risk threshold by evaluating whether a number M is greater than a threshold number N, wherein the number M is one or more nominally-persistent messages have not yet been saved to the persistent storage, and wherein the threshold number N represents a defined acceptable number of nominally-persistent messages held within one or more queues at the messaging system which nominally-persistent messages have not yet been saved to the persistent storage; and in response to determining that the risk of losing the plurality of nominally-persistent messages exceeds the at least one risk threshold, saving the plurality of nominally-persistent messages to a persistent storage of the messaging system, wherein the persistent storage is a non-volatile storage.

2. The method of claim 1, wherein the evaluating is performed in response to the messaging system receiving a message.

3. The method of claim 1, wherein the evaluating is performed periodically, in response to expiry of a timer.

4. The method of claim 1, wherein the evaluating is performed in response to a persistent message queue reaching a threshold queue depth.

5. The method of claim 1, wherein the evaluating is performed in response to a persistence manager being notified of receipt of a nominally-persistent message.

6. A method according to claim 1,
wherein the plurality of nominally-persistent messages includes one or more of message data and message state information.

7. The method of claim 6, wherein the evaluating further comprises:
monitoring the set of metrics related to the processing of messages by the messaging system, wherein the set of metrics comprises a number of nominally-persistent messages at risk, time since last system failure, and a number of retained nominally-persistent messages at risk; and
monitoring the set of metrics related to the processing of messages by the messaging system, wherein the set of metrics comprises a sender-specified persistence classification for a selected message.

8. A method according to claim 1, further comprising:
in response to a determination that the risk of losing the plurality of nominally-persistent messages exceeds the at least one risk threshold:
identifying a first subset of the plurality of nominally-persistent messages to save to the persistent storage on a per client basis;
repeating the evaluating the level of exposure of the messaging system to the risk of losing the plurality of nominally-persistent messages as a result of saving the first subset to the persistent storage; and
in response to the repeated evaluating determining that the risk of losing a plurality of nominally-persistent messages exceeds the at least one risk threshold, identifying a second subset of the plurality of nominally-persistent messages to save to the persistent storage.

9. The method of claim 1, further comprising:
adjusting the at least one risk threshold based at least in part upon a history of power failures;
wherein the evaluating is based at least in part on:
system uptime and computing averages as compared to current operation of the messaging system; and
an obligation of a service level agreement;
wherein the at least one threshold may be tuned based on an event.

10. The method of claim 1, wherein the evaluating further comprises:
detecting a trigger condition of disconnection of a publisher or subscriber; and
detecting a trigger condition of a battery backup having taken over for a power supply.

11. The method of claim 1, wherein the evaluating further comprises comparing a published message with a subscription requirement for subscribers that wish to receive the published message.

12. The method of claim 1, wherein:
the saving the plurality of nominally-persistent messages persists only until the risk of losing messages being reduced to an acceptable level; and
the saving data is performed repeatedly only while the risk of losing the plurality of nominally-persistent messages exceeds the at least one risk threshold.

13. The method of claim 12, wherein the saving the plurality of nominally-persistent messages persists only until all available data relating to message-based communication is saved to persistent storage.

14. The method of claim 1, wherein the level of exposure is a set of criteria including at least one of:
one or more messaging statistics of the plurality of nominally-persistent messages;
a number of nominally-persistent messages of the plurality of nominally-persistent messages held within one or more queues and awaiting delivery to recipients;
one or more sender-specified persistence classifications for the plurality of nominally-persistent messages;
data relating to failures of the messaging system;
an estimate of the time until a next failure with reference to statistics for recent system failures;
a detection of conditions likely to result in a failure;
data relating to an actual message loss; and
a recognition of a need for increased persistence to avoid further losses of the plurality of nominally-persistent messages in order to comply with one or more obligations of a service level agreement.

15. A data processing apparatus comprising:
a processor;
a volatile data store;
a non-volatile data store;
a messaging manager; and
a persistence manager that when executed by the processor causes the apparatus to:
evaluate a level of exposure of the messaging system to a risk of losing a plurality of nominally-persistent messages stored within the volatile data store in the event of failure of the data processing apparatus, wherein the plurality of nominally-persistent messages are candidates for saving to a non-volatile storage, wherein the persistent manager evaluates by:
monitoring a set of metrics related to a processing of messages by the messaging system, wherein the monitoring further comprises monitoring the number M within one or more queues at the messaging system; and
comparing monitored values for the set of metrics with a set of threshold values to determine whether the monitored values are within acceptable risk thresholds, wherein the comparing further comprises comparing the number M with the threshold number N;
in response to the processor causing the apparatus to evaluate the level of exposure, determine whether the risk of losing a plurality of nominally-persistent messages exceeds at least one risk threshold by evaluating whether a number M is greater than a threshold number N, wherein the number M is one or more nominally-persistent messages have not yet been saved to the persistent storage, and wherein the threshold number N represents a defined acceptable number of nominally-persistent messages held within one or more queues at the messaging system which nominally-persistent messages have not yet been saved to the persistent storage; and in response to determining that the risk of losing the plurality of nominally-persistent messages exceeds the at least one risk threshold, initiates an operation of saving the plurality of nominally-persistent messages to the non-volatile data store.

16. The data processing apparatus according to claim 15, wherein the non-volatile data store is one of a limited-write-cycle data store and a flash memory.

17. The data processing apparatus according to claim 15, wherein the level of exposure is a set of criteria including at least one of:
   one or more messaging statistics of the plurality of nominally-persistent messages;
   a number of nominally-persistent messages of the plurality of nominally-persistent messages held within one or more queues and awaiting delivery to recipients;
   one or more sender-specified persistence classifications for the plurality of nominally-persistent messages;
   data relating to failures of the messaging system;
   an estimate of the time until a next failure with reference to statistics for recent system failures;
   a detection of conditions likely to result in a failure;
   data relating to an actual message loss; and
   a recognition of a need for increased persistence to avoid further losses of the plurality of nominally-persistent messages in order to comply with one or more obligations of a service level agreement.

18. A computer program product in a non-transitory computer readable storage medium comprising a set of computer instructions that when executed by a processor performs the functions of:
   evaluating a level of exposure of the messaging system to a risk of losing a plurality of nominally-persistent messages stored within a volatile storage of the messaging system in the event of a failure of the messaging system, wherein the plurality of nominally-persistent messages are candidates for saving to a non-volatile storage, and wherein the plurality of nominally-persistent messages includes one or more of message data and message state information, the evaluating further comprising:
      monitoring a set of metrics related to a processing of messages by the messaging system, wherein the monitoring further comprises monitoring the number M within one or more queues at the messaging system; and
      comparing monitored values for the set of metrics with a set of threshold values to determine whether the monitored values are within acceptable risk thresholds, wherein the comparing further comprises comparing the number M with the threshold number N;
   determining whether the risk of losing a plurality of nominally-persistent messages exceeds at least one risk threshold by evaluating whether a number M is greater than a threshold number N, wherein the number M is one or more nominally-persistent messages have not yet been saved to the persistent storage, and wherein the threshold number N represents a defined acceptable number of nominally-persistent messages held within one or more queues at the messaging system which nominally-persistent messages have not yet been saved to the persistent storage; and
   in response to determining that the risk of losing the plurality of nominally-persistent messages exceeds the at least one risk threshold, saving the plurality of nominally-persistent messages to a persistent storage of the messaging system, wherein the persistent storage is a non-volatile storage.

19. The computer program product of claim 18, wherein the level of exposure is a set of criteria including:
   one or more messaging statistics of the plurality of nominally-persistent messages;
   a number of nominally-persistent messages of the plurality of nominally-persistent messages held within one or more queues and awaiting delivery to recipients;
   one or more sender-specified persistence classifications for the plurality of nominally-persistent messages;
   data relating to failures of the messaging system;
   an estimate of the time until a next failure with reference to statistics for recent system failures;
   a detection of conditions likely to result in a failure;
   data relating to an actual message loss; and
   a recognition of a need for increased persistence to avoid further losses of the plurality of nominally-persistent messages in order to comply with one or more obligations of a service level agreement.

* * * * *